United States Patent
Sundararajan et al.

(10) Patent No.: US 12,294,594 B2
(45) Date of Patent: *May 6, 2025

(54) INTELLIGENT QUARANTINE ON SWITCH FABRIC FOR PHYSICAL AND VIRTUALIZED INFRASTRUCTURE

(71) Applicant: Cisco Technology, Inc., San Jose, CA (US)

(72) Inventors: Balaji Sundararajan, Fremont, CA (US); Gaurang Rajeev Mokashi, Sunnyvale, CA (US); Preety Mordani, Fremont, CA (US); Vivek Agarwal, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,437

(22) Filed: Mar. 4, 2024

(65) Prior Publication Data

US 2024/0250966 A1   Jul. 25, 2024

Related U.S. Application Data

(63) Continuation of application No. 18/415,423, filed on Jan. 17, 2024, which is a continuation of application No. 18/171,322, filed on Feb. 17, 2023, now Pat. No. 11,888,876, which is a continuation of application No. 16/826,082, filed on Mar. 20, 2020, now Pat. No. 11,606,369.

(51) Int. Cl.
*H04L 9/40* (2022.01)
*G06F 9/455* (2018.01)
*H04L 43/08* (2022.01)
*H04L 47/20* (2022.01)
*H04L 49/25* (2022.01)

(52) U.S. Cl.
CPC ...... *H04L 63/1416* (2013.01); *G06F 9/45558* (2013.01); *H04L 43/08* (2013.01); *H04L 47/20* (2013.01); *H04L 49/25* (2013.01); *H04L 63/20* (2013.01); *G06F 2009/45587* (2013.01); *G06F 2009/45595* (2013.01)

(58) Field of Classification Search
None
See application file for complete search history.

(56) References Cited

U.S. PATENT DOCUMENTS 9,197,664 B1   11/2015   Aziz et al.
9,591,020 B1   3/2017   Aziz
(Continued)

FOREIGN PATENT DOCUMENTS

EP   3486775 A1 *   5/2019   ........... G06F 21/602

*Primary Examiner* — Joseph P Hirl
*Assistant Examiner* — Hassan Saadoun
(74) *Attorney, Agent, or Firm* — Polsinelli P.C.

(57) ABSTRACT

Systems, methods, and computer-readable media for performing threat remediation through a switch fabric of a virtualized network environment. Data traffic passing into a virtualized network environment including a plurality of virtual machines running on a switch fabric is monitored. A network threat introduced through at a least a portion of the data traffic is identified at the switch fabric. One or more remedial measures are performed in the network environment based on the identification of the network threat in the virtualized network environment.

20 Claims, 8 Drawing Sheets

(56) References Cited

U.S. PATENT DOCUMENTS

| | | | |
|---|---|---|---|
| 11,159,389 | B1 | 10/2021 | Miriyala et al. |
| 11,245,721 | B2 | 2/2022 | Konda et al. |
| 11,750,622 | B1 | 9/2023 | Kim et al. |
| 2010/0202466 | A1* | 8/2010 | Eswaran ................ H04L 45/02 370/400 |
| 2010/0212005 | A1* | 8/2010 | Eswaran ............ H04L 63/1408 726/13 |
| 2013/0219497 | A1 | 8/2013 | Lukas et al. |
| 2013/0219500 | A1 | 8/2013 | Lukas et al. |
| 2016/0164894 | A1* | 6/2016 | Zeitlin ................ H04L 63/1416 726/23 |
| 2016/0171215 | A1 | 6/2016 | Bank et al. |
| 2017/0118041 | A1* | 4/2017 | Bhattacharya ...... H04L 41/0895 |
| 2017/0163685 | A1* | 6/2017 | Schwartz ............ H04W 12/088 |
| 2017/0366575 | A1 | 12/2017 | Polepalli et al. |
| 2018/0006921 | A1* | 1/2018 | Mozes ................ H04L 63/101 |
| 2018/0091547 | A1 | 3/2018 | St. Pierre |
| 2018/0139221 | A1 | 5/2018 | Chen |
| 2018/0189489 | A1 | 7/2018 | Zhang et al. |
| 2019/0028505 | A1* | 1/2019 | Shpiner ............... H04L 63/1425 |
| 2019/0199746 | A1 | 6/2019 | Doron et al. |
| 2020/0106742 | A1 | 4/2020 | Moore et al. |
| 2020/0278892 | A1 | 9/2020 | Nainar et al. |

* cited by examiner

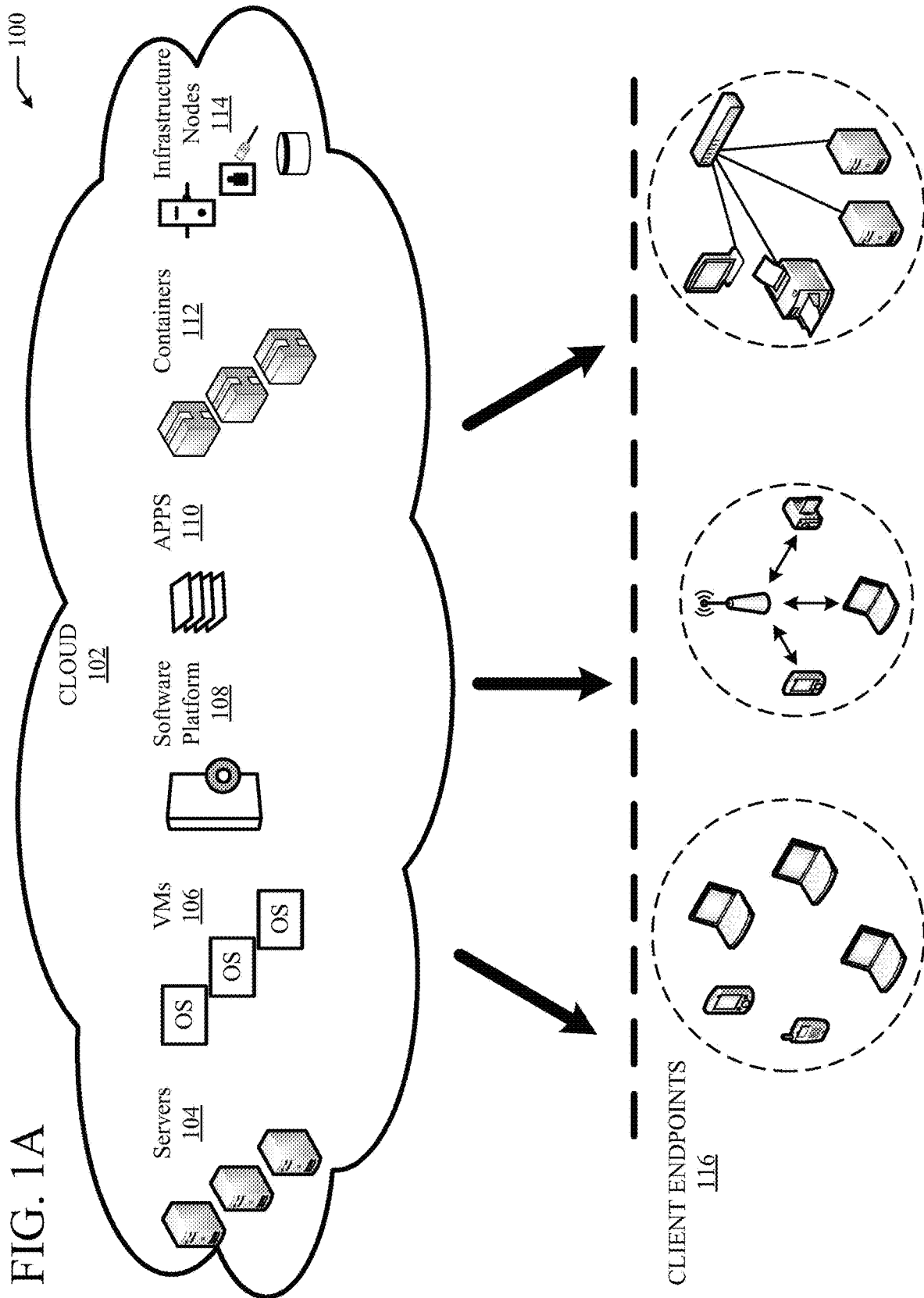

INTELLIGENT QUARANTINE ON SWITCH FABRIC FOR PHYSICAL AND VIRTUALIZED INFRASTRUCTURE

CROSS-REFERENCE TO RELATED APPLICATIONS

This Application is a Continuation of U.S. patent application Ser. No. 18/415,423 entitled INTELLIGENT QUARANTINE ON SWITCH FABRIC FOR PHYSICAL AND VIRTUALIZED INFRASTRUCTURE filed Jan. 17, 2024, which in turn is a continuation of and claims priority to Continuation of U.S. patent application Ser. No. 18/171,322 entitled INTELLIGENT QUARANTINE ON SWITCH FABRIC FOR PHYSICAL AND VIRTUALIZED INFRASTRUCTURE filed Feb. 17, 2023, which in turn is a continuation of and claims priority to, U.S. patent application Ser. No. 16/826,082 entitled INTELLIGENT QUARANTINE ON SWITCH FABRIC FOR PHYSICAL AND VIRTUALIZED INFRASTRUCTURE filed Mar. 20, 2020, the contents of which are expressly incorporated by reference herein in in their entirety.

TECHNICAL FIELD

The present technology pertains in general to threat remediation through a switch fabric of a virtualized network environment.

BACKGROUND

Network virtualization abstracts networking connectivity and services that have traditionally been delivered via hardware into a logical virtual network that runs on top of a physical network through one or more hypervisors. Network virtualization can be implemented through virtual network functions (VNFs) running on virtual machines (VMs). These VNFs can handle or otherwise perform specific network functions like firewall functions or load balancing functions. Further, in a virtualized network environment, VMs are typically implemented over a switch fabric of the virtualized network environment. Specifically, VMs, or otherwise virtualized compute nodes, are typically connected together in the virtualized network environment over a switch fabric of the network environment.

The increased use of virtualized network environments in the field of networking has raised additional security concerns, in particular as attackers become more sophisticated. Specifically, virtualized network environments are susceptible to a wide variety of network threats, such as rogue VMs, denial-of-service (DoS) attacks, malware attacks, and other types of malicious data traffic. A number of different tools have been developed to detect and isolate such threats at the VMs and the hypervisors supporting the VMs in a virtualized network environment. However, such tools suffer from a number of deficiencies. Specifically, network threats have already crossed the switch fabric of a virtualized network environment when threat remediation is performed in the hypervisor layer or the VM layer. As a result, a large number of VMs can be exposed to the network threat making it more difficult and costly, from a computational perspective, to isolate and remedy the threat. Further, this can cause increased latency in the virtualized network environment, e.g. as a result of the large amount of computational resources used to isolate and remedy the threat.

BRIEF DESCRIPTION OF THE DRAWINGS

FIG. 1A illustrates an example cloud computing architecture;

DETAILED DESCRIPTION

Figure 1B:
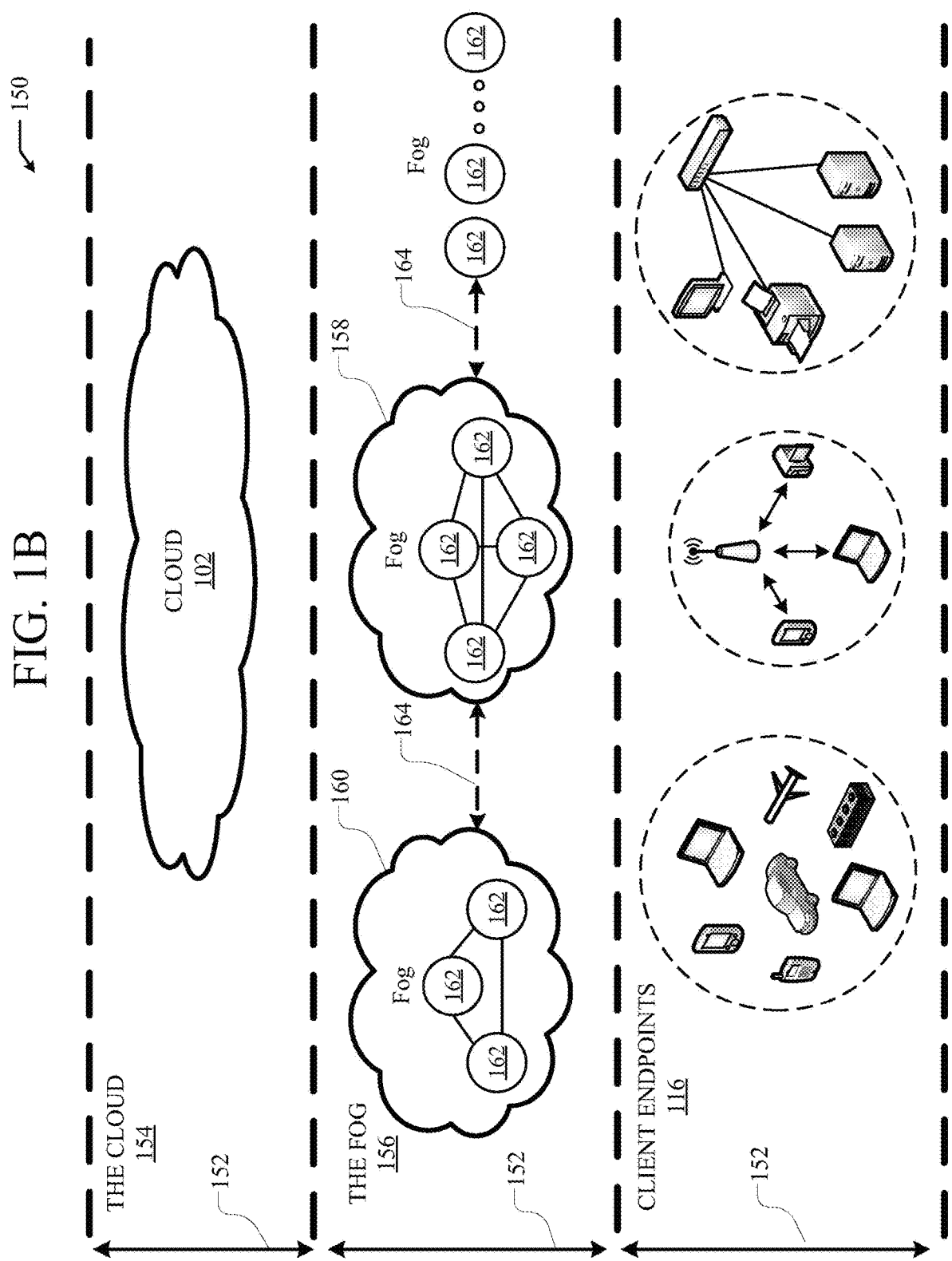
FIG. 1B illustrates an example fog computing architecture.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description.

As used herein, "one embodiment" or "an embodiment" can refer to the same embodiment or any embodiment(s). Moreover, reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Features described herein with reference to one embodiment can be combined with features described with reference to any embodiment.

The terms used in this specification generally have their ordinary meanings in the art, within the context of the disclosure and the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification, including examples of any terms discussed herein, is illustrative and not intended to limit the scope and meaning of the disclosure or any example term. Likewise, the disclosure is not limited to the specific embodiments or examples described in this disclosure.

Without intent to limit the scope of the disclosure, examples of instruments, apparatus, methods and their related functionalities are provided below. Titles or subtitles may be used in the examples for convenience of a reader, and in no way should limit the scope of the disclosure. Unless otherwise defined, technical and scientific terms used herein have the meaning as commonly understood by one of ordinary skill in the art to which this disclosure pertains. In the case of a conflict, the present document and included definitions will control.

Additional features and advantages of the disclosure will be set forth in the description which follows, and in part will be recognized from the description, or can be learned by practice of the herein disclosed principles. The features and advantages of the disclosure can be realized and obtained by means of the instruments and combinations particularly pointed out herein. These and other features of the disclosure will become more fully apparent from the following description and appended claims, or can be learned by the practice of the principles set forth herein.

Overview

A method can include monitoring data traffic passing into a virtualized network environment. The virtualized network environment can include a plurality of virtual machines running on a switch fabric. The method can also include identifying, at the switch fabric, a network threat introduced into the virtualized network environment through at least a portion of the data traffic passing into the virtual network environment. Further, the method can include performing one or more remedial measures in the virtualized network environment based on the identification of the network threat in the virtualized network environment. The switch fabric can be a virtualized switch fabric in the network virtualized network environment.

The at least a portion of the data traffic introducing the network threat into the virtualized network environment can be intercepted at the switch fabric. Further, the one or more remedial measures can be performed while the at least a portion of the data traffic remains in the switch fabric.

Performing the one or more remedial measures can include preventing transmission of the at least a portion of the data traffic introducing the network threat to either or both the virtual machines and one or more hypervisors hosting the virtual machines in the virtualized network environment. Further, performing the one or more remedial measures can include preventing transmission of the at least a portion of the data traffic introducing the network threat to either or both the virtual machines one or more hypervisors hosting the virtual machines in the virtualized network environment.

The network threat can be identified at a first node in the switch fabric. Further, threat information regarding the network threat introduced into the virtual network environment can be generated. As follows, the threat information can be propagated to one or more additional nodes in the switch fabric distinct from the first node in the switch fabric where the network threat is identified. The one or more additional nodes in the switch fabric can identify one or more additional network threats introduced into the virtualized network environment based on the threat information. The first node in the switch fabric can receive the at least a portion of the data traffic introducing the network threat as an ingress point for the switch fabric. Further, the first node can locally identify the network threat introduced through the at least a portion of the data traffic received at the first node. The threat information for the network threat can include one or a combination of an identification of a type of threat of the network threat, an identification of a source of the at least a portion of the data traffic introducing the network threat into the virtualized network environment, a signature of the at least a portion of the data traffic, and an identification of characteristics of the at least a portion of the data traffic.

The at least a portion of the data traffic introducing the network threat can be matched to a known network threat based on a signature of the at least a portion of the data traffic and a signature of the known network threat. In turn, the network threat in the at least a portion of the data traffic can be identified based on a matching of the at least a portion of the data traffic to the known network threat. The known network threat and the signature of the known network threat can be identified previously in one or more network environments. Further, the at least a portion of the data traffic introducing the network threat can be matched to the known network threat locally within the switch fabric based on one or more policies distributed to nodes within the switch fabric. The one or more policies distributed to the nodes within the switch fabric can include the signature of the known network threat.

The network threat can be identified in the at least a portion of the data traffic based on inclusion of one or more characteristics of the at least a portion of the data traffic in a traffic exclusion list associated with the virtualized network environment. The traffic exclusion list can specify one or more characteristics of traffic to refrain from transmitting through the virtualized network environment. Further, the traffic exclusion list can be included in one or more policies distributed to nodes within the switch fabric. In turn, one or more nodes in the switch fabric can locally identify the network threat in the at least a portion of the data traffic using the traffic exclusion list included in the one or more policies.

A system can include one or more processors and at least one computer-readable storage medium storing instructions which, when executed by the one or more processors, cause the one or more processors to monitor data traffic passing into a virtualized network environment including a plurality of virtual machines running on a switch fabric that is virtualized in the virtualized network environment. The instructions can also cause the one or more processors to identify, at the switch fabric, a network threat introduced into the virtualized network environment through at least a portion of the data traffic passing into the virtualized network environment. Further, the instructions can cause the one or more processors to perform one or more remedial measures in the virtualized network environment based on the identification of the network threat in the virtualized network environment.

A non-transitory computer-readable storage medium having stored therein instructions which, when executed by a processor, cause the processor to monitor data traffic passing into a virtualized network environment including a plurality of virtual machines running on a switch fabric. The instructions can also cause the processor to identify, at the switch fabric, a network threat introduced into the virtualized network environment through at least a portion of the data traffic passing into the virtualized network environment. Further, the instructions can cause the processor to intercept the at least a portion of the data traffic introducing the network threat into the virtualized network environment at the switch fabric. Additionally, the instructions can cause the processor to perform one or more remedial measures in the virtualized network environment based on the identification of the network threat in the virtualized network environment while the at least a portion of the data traffic remains in the switch fabric.

Description of Example Embodiments

The disclosed technology addresses the need in the art for performing threat remediation through a switch fabric of a virtualized network environment. In particular, the disclosed technology address the need in the art for identifying and remedying a network threat at a switch fabric of a virtualized network environment, before the network threat is spread to one or more VMs and one or more hypervisors supporting the one or more VMs in the virtualized network environment. The present technology involves systems, methods, and computer-readable media for performing threat remediation through a switch fabric of a virtualized network environment. In particular, the present technology involves systems, methods, and computer-readable media for identifying a network threat at a switch fabric of a virtualized network environment and performing one or more remedial measures before the threat is propagated further into the network environment beyond the switch fabric.

Figure 3:
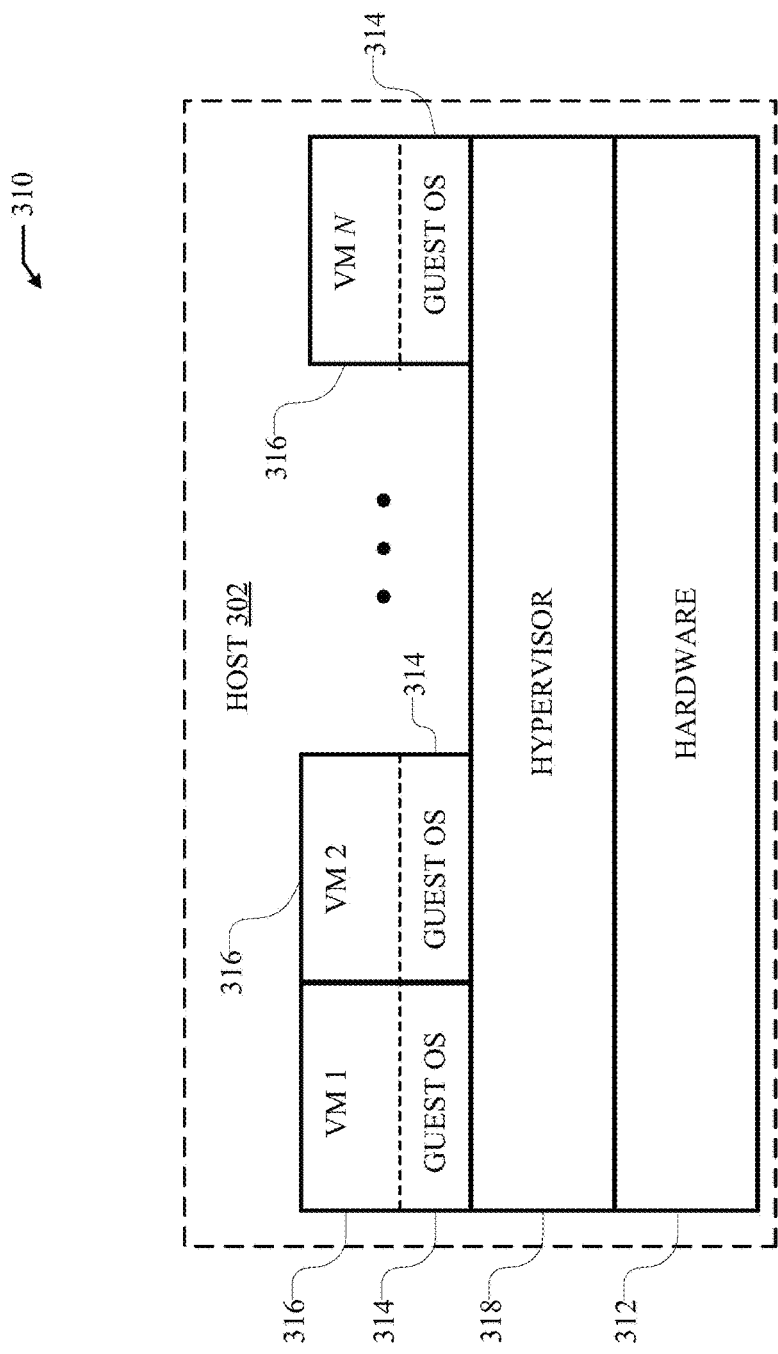
FIG. 3 illustrates a schematic diagram of an example virtual machine (VM) deployment.
Figure 4:
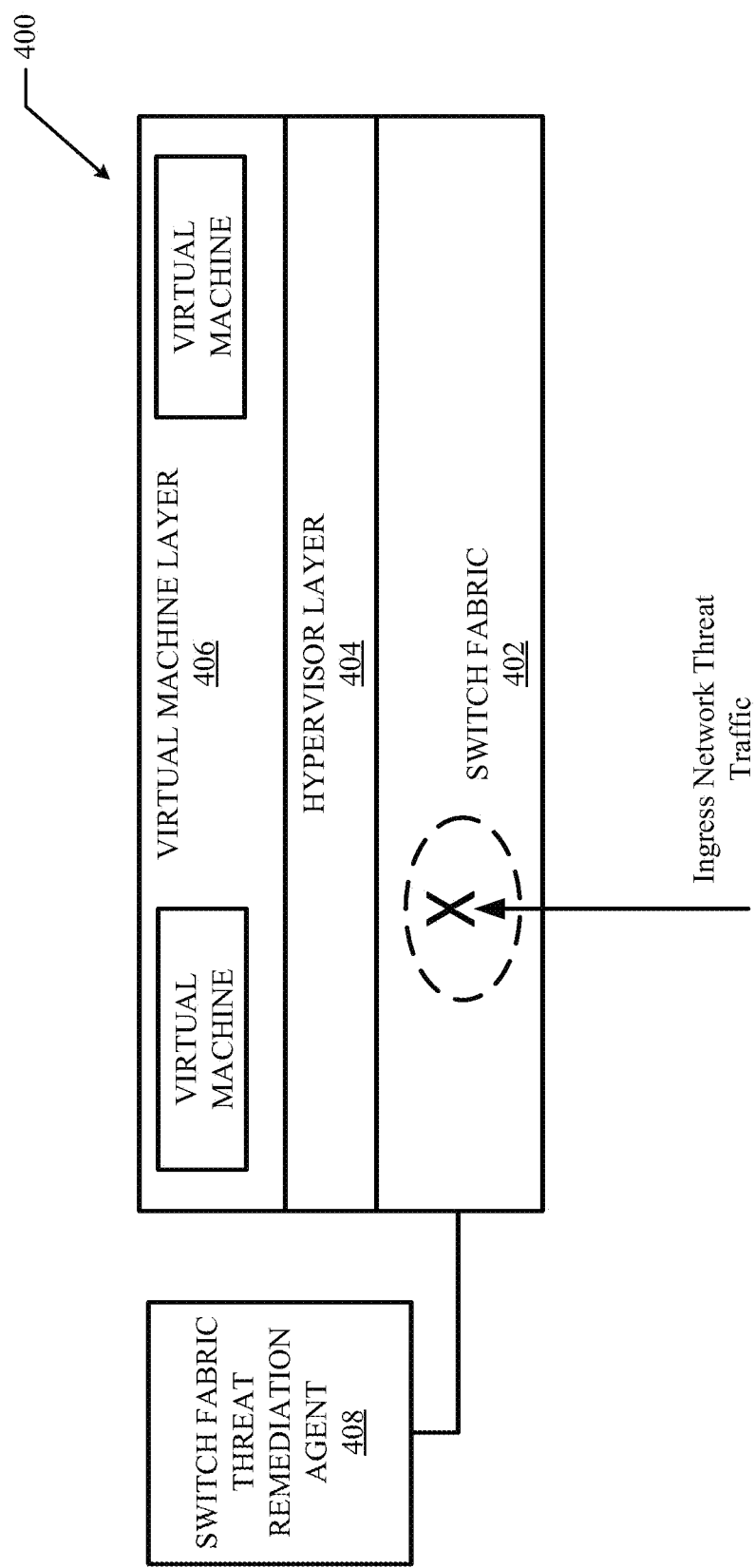
FIG. 4 illustrates an example virtualized network environment for performing threat remediation in a switch fabric, in accordance with various aspects of the subject technology.
Figure 5:
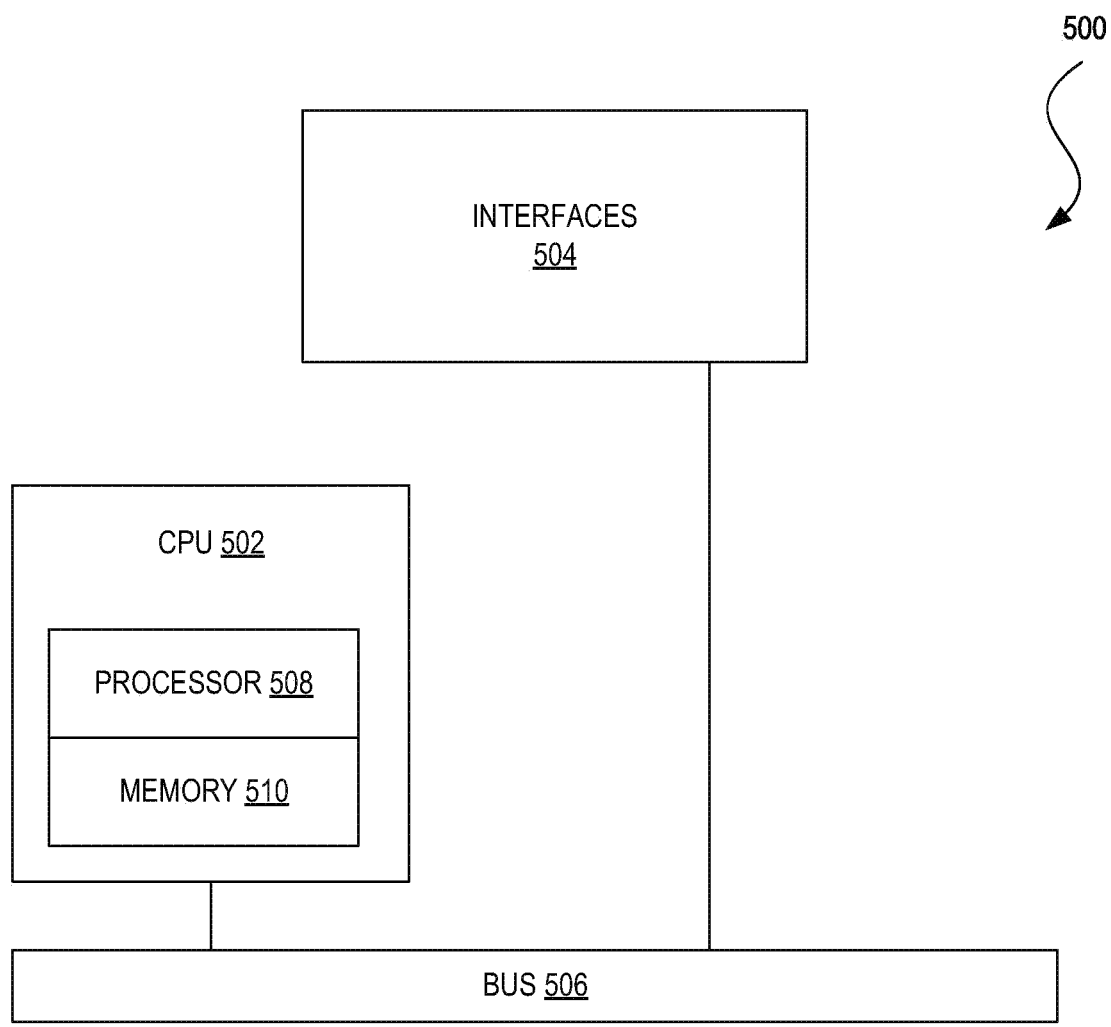
FIG. 5 illustrates an example network device.
Figure 6:
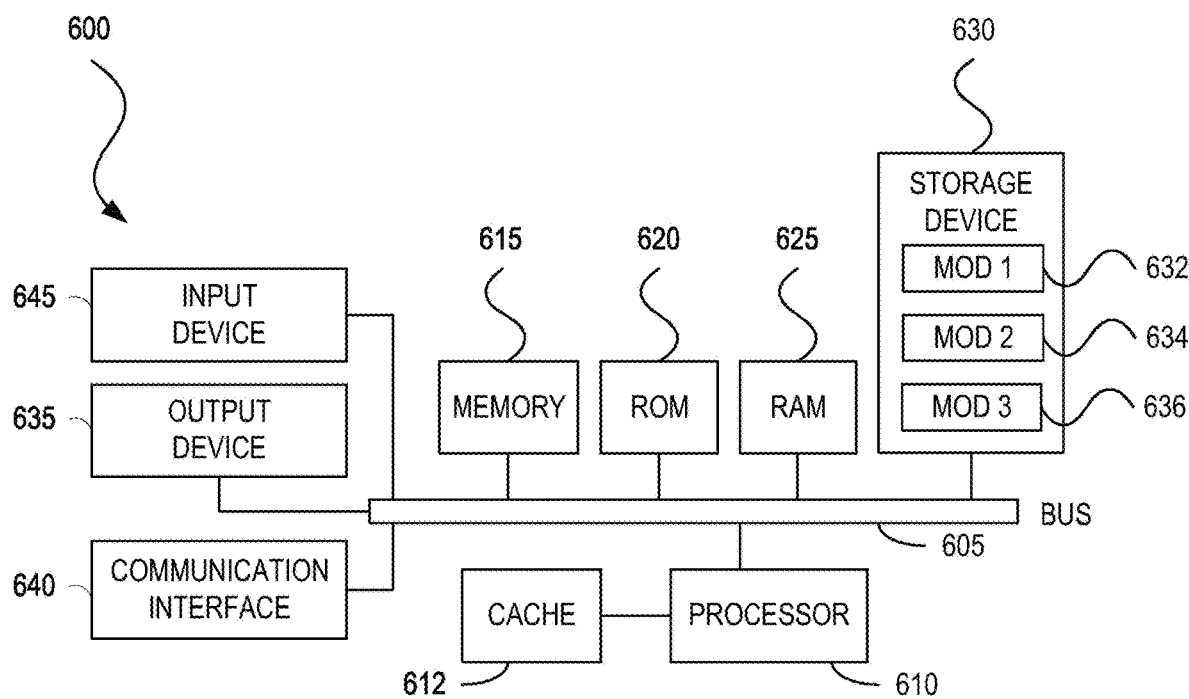
FIG. 6 illustrates an example computing system.

A description of network environments and architectures for network data access and services, as illustrated in FIGS. 1A, 1B, 2A, 2B is first disclosed herein. A discussion of systems, methods, and computer-readable media for implementing virtual machine network deployments and providing threat remediation in a switch fabric of a virtualized network environment, as shown in FIGS. 3-4, will then follow. The discussion then concludes with a brief description of example devices, as illustrated in FIGS. 5 and 6. These variations shall be described herein as the various embodiments are set forth. The disclosure now turns to FIG. 1A.

FIG. 1A illustrates a diagram of an example cloud computing architecture 100. The architecture can include a cloud 102. The cloud 102 can include one or more private clouds, public clouds, and/or hybrid clouds. Moreover, the cloud 102 can include cloud elements 104-114. The cloud elements 104-114 can include, for example, servers 104, VMs 106, one or more software platforms 108, applications or services 110, software containers 112, and infrastructure nodes 114. The infrastructure nodes 114 can include various types of nodes, such as compute nodes, storage nodes, network nodes, management systems, etc.

The cloud 102 can provide various cloud computing services via the cloud elements 104-114, such as software as a service (SaaS) (e.g., collaboration services, email services, enterprise resource planning services, content services, communication services, etc.), infrastructure as a service (IaaS) (e.g., security services, networking services, systems management services, etc.), platform as a service (PaaS) (e.g., web services, streaming services, application development services, etc.), and other types of services such as desktop as a service (DaaS), information technology management as a service (ITaaS), managed software as a service (MSaaS), mobile backend as a service (MBaaS), etc.

The client endpoints 116 can connect with the cloud 102 to obtain one or more specific services from the cloud 102. The client endpoints 116 can communicate with elements 104-114 via one or more public networks (e.g., Internet), private networks, and/or hybrid networks (e.g., virtual private network). The client endpoints 116 can include any device with networking capabilities, such as a laptop computer, a tablet computer, a server, a desktop computer, a smartphone, a network device (e.g., an access point, a router, a switch, etc.), a smart television, a smart car, a sensor, a GPS device, a game system, a smart wearable object (e.g., smartwatch, etc.), a consumer object (e.g., Internet refrigerator, smart lighting system, etc.), a city or transportation system (e.g., traffic control, toll collection system, etc.), an internet of things (IoT) device, a camera, a network printer, a transportation system (e.g., airplane, train, motorcycle, boat, etc.), or any smart or connected object (e.g., smart home, smart building, smart retail, smart glasses, etc.), and so forth.

FIG. 1B illustrates a diagram of an example fog computing architecture 150. The fog computing architecture 150 can include the cloud layer 154, which includes the cloud 102 and any other cloud system or environment, and the fog layer 156, which includes fog nodes 162. The client endpoints 116 can communicate with the cloud layer 154 and/or the fog layer 156. The architecture 150 can include one or more communication links 152 between the cloud layer 154, the fog layer 156, and the client endpoints 116. Communications can flow up to the cloud layer 154 and/or down to the client endpoints 116.

The fog layer 156 or "the fog" provides the computation, storage and networking capabilities of traditional cloud networks, but closer to the endpoints. The fog can thus extend the cloud 102 to be closer to the client endpoints 116. The fog nodes 162 can be the physical implementation of fog networks. Moreover, the fog nodes 162 can provide local or regional services and/or connectivity to the client endpoints 116. As a result, traffic and/or data can be offloaded from the cloud 102 to the fog layer 156 (e.g., via fog nodes 162). The fog layer 156 can thus provide faster services and/or connectivity to the client endpoints 116, with lower latency, as well as other advantages such as security benefits from keeping the data inside the local or regional network(s).

The fog nodes 162 can include any networked computing devices, such as servers, switches, routers, controllers, cameras, access points, gateways, etc. Moreover, the fog nodes 162 can be deployed anywhere with a network connection, such as a factory floor, a power pole, alongside a railway track, in a vehicle, on an oil rig, in an airport, on an aircraft, in a shopping center, in a hospital, in a park, in a parking garage, in a library, etc.

In some configurations, one or more fog nodes 162 can be deployed within fog instances 158, 160. The fog instances 158, 160 can be local or regional clouds or networks. For example, the fog instances 158, 160 can be a regional cloud or data center, a local area network, a network of fog nodes 162, etc. In some configurations, one or more fog nodes 162 can be deployed within a network, or as standalone or individual nodes, for example. Moreover, one or more of the fog nodes 162 can be interconnected with each other via links 164 in various topologies, including star, ring, mesh or hierarchical arrangements, for example.

In some cases, one or more fog nodes 162 can be mobile fog nodes. The mobile fog nodes can move to different geographical locations, logical locations or networks, and/or fog instances while maintaining connectivity with the cloud layer 154 and/or the endpoints 116. For example, a particular fog node can be placed in a vehicle, such as an aircraft or train, which can travel from one geographical location and/or logical location to a different geographical location and/or logical location. In this example, the particular fog node may connect to a particular physical and/or logical connection point with the cloud 154 while located at the starting location and switch to a different physical and/or logical connection point with the cloud 154 while located at the destination location. The particular fog node can thus move within particular clouds and/or fog instances and, therefore, serve endpoints from different locations at different times.

Figure 2A:
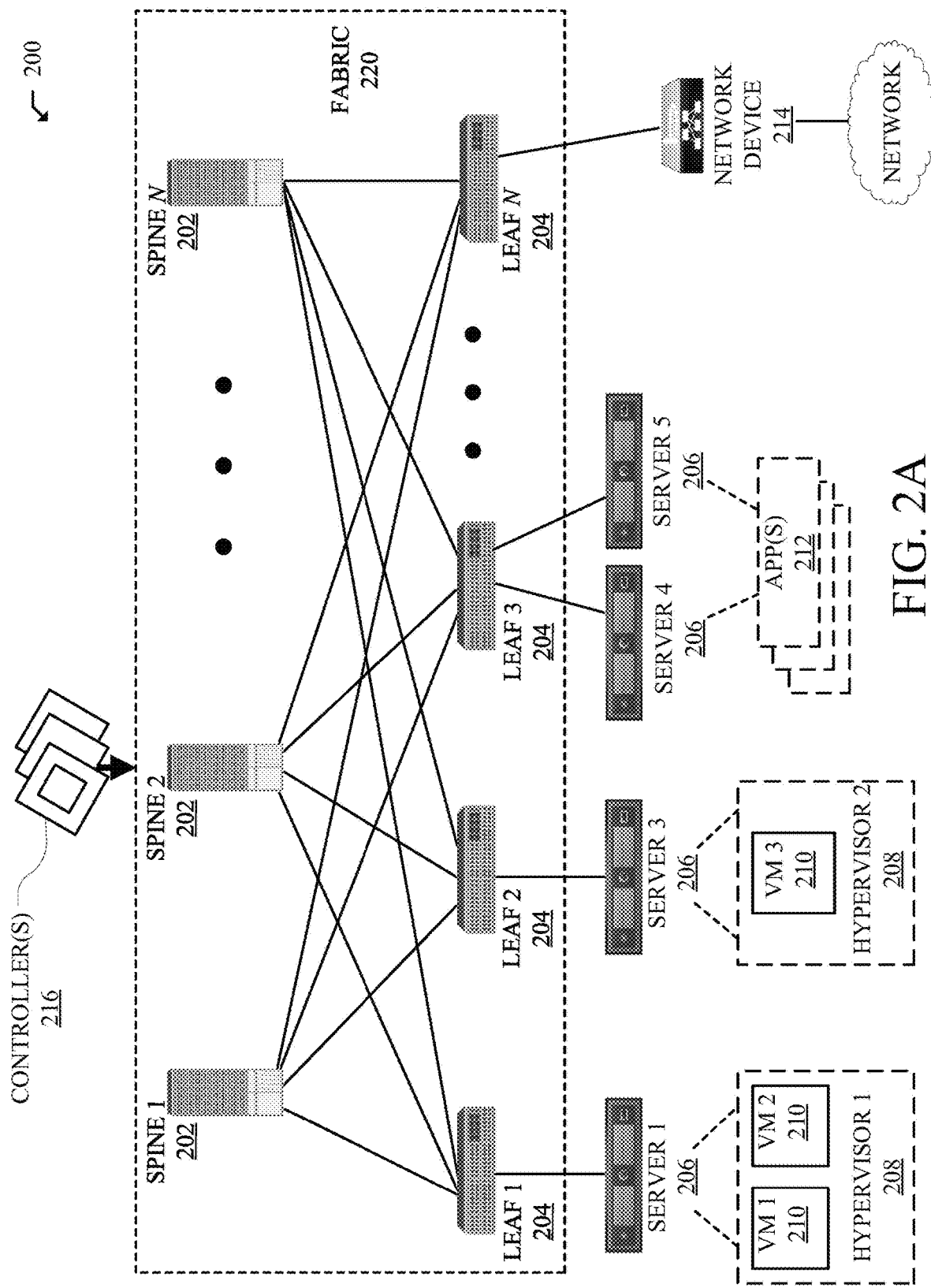
FIG. 2A illustrates a diagram of an example network environment, such as a data center.

FIG. 2A illustrates a diagram of an example Network Environment 200, such as a data center. In some cases, the Network Environment 200 can include a data center, which can support and/or host the cloud 102. The Network Environment 200 can include a Fabric 220 which can represent the physical layer or infrastructure (e.g., underlay) of the Network Environment 200. Fabric 220 can include Spines 202 (e.g., spine routers or switches) and Leafs 204 (e.g., leaf routers or switches) which can be interconnected for routing or switching traffic in the Fabric 220. Spines 202 can interconnect Leafs 204 in the Fabric 220, and Leafs 204 can connect the Fabric 220 to an overlay or logical portion of the Network Environment 200, which can include application services, servers, virtual machines, containers, endpoints, etc. Thus, network connectivity in the Fabric 220 can flow from Spines 202 to Leafs 204, and vice versa. The interconnections between Leafs 204 and Spines 202 can be redundant (e.g., multiple interconnections) to avoid a failure in routing. In some embodiments, Leafs 204 and Spines 202 can be fully connected, such that any given Leaf is connected to each of the Spines 202, and any given Spine is connected to each of the Leafs 204. Leafs 204 can be, for example, top-of-rack ("ToR") switches, aggregation switches, gateways, ingress and/or egress switches, provider edge devices, and/or any other type of routing or switching device.

Leafs 204 can be responsible for routing and/or bridging tenant or customer packets and applying network policies or rules. Network policies and rules can be driven by one or more Controllers 216, and/or implemented or enforced by one or more devices, such as Leafs 204. Leafs 204 can connect other elements to the Fabric 220. For example, Leafs 204 can connect Servers 206, Hypervisors 208, VMs 210, Applications 212, Network Device 214, etc., with Fabric 220. Such elements can reside in one or more logical or virtual layers or networks, such as an overlay network. In some cases, Leafs 204 can encapsulate and decapsulate packets to and from such elements (e.g., Servers 206) in order to enable communications throughout Network Environment 200 and Fabric 220. Leafs 204 can also provide any other devices, services, tenants, or workloads with access to Fabric 220. In some cases, Servers 206 connected to Leafs 204 can similarly encapsulate and decapsulate packets to and from Leafs 204. For example, Servers 206 can include one or more virtual switches or routers or tunnel endpoints for tunneling packets between an overlay or logical layer hosted by, or connected to, Servers 206 and an underlay layer represented by Fabric 220 and accessed via Leafs 204.

Applications 212 can include software applications, services, containers, appliances, functions, service chains, etc. For example, Applications 212 can include a firewall, a database, a CDN server, an IDS/IPS, a deep packet inspection service, a message router, a virtual switch, etc. An application from Applications 212 can be distributed, chained, or hosted by multiple endpoints (e.g., Servers 206, VMs 210, etc.), or may run or execute entirely from a single endpoint.

VMs 210 can be virtual machines hosted by Hypervisors 208 or virtual machine managers running on Servers 206. VMs 210 can include workloads running on a guest operating system on a respective server. Hypervisors 208 can provide a layer of software, firmware, and/or hardware that creates, manages, and/or runs the VMs 210. Hypervisors 208 can allow VMs 210 to share hardware resources on Servers 206, and the hardware resources on Servers 206 to appear as multiple, separate hardware platforms. Moreover, Hypervisors 208 on Servers 206 can host one or more VMs 210.

In some cases, VMs 210 can be migrated to other Servers 206. Servers 206 can similarly be migrated to other physical locations in Network Environment 200. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 206, Hypervisors 208, and/or VMs 210 can represent or reside in a tenant or customer space. Tenant space can include workloads, services, applications, devices, networks, and/or resources that are associated with one or more clients or subscribers. Accordingly, traffic in Network Environment 200 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 216, Servers 206, Leafs 204, etc.

Configurations in Network Environment 200 can be implemented at a logical level, a hardware level (e.g., physical), and/or both. For example, configurations can be implemented at a logical and/or hardware level based on endpoint or resource attributes, such as endpoint types and/or application groups or profiles, through a software-defined networking (SDN) framework (e.g., Application-Centric Infrastructure (ACI) or VMWARE NSX). To illustrate, one or more administrators can define configurations at a logical level (e.g., application or software level) through Controllers 216, which can implement or propagate such configurations through Network Environment 200. In some examples, Controllers 216 can be Application Policy Infrastructure Controllers (APICs) in an ACI framework. In other examples, Controllers 216 can be one or more management components for associated with other SDN solutions, such as NSX Managers.

Such configurations can define rules, policies, priorities, protocols, attributes, objects, etc., for routing and/or classifying traffic in Network Environment 200. For example, such configurations can define attributes and objects for classifying and processing traffic based on Endpoint Groups, Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 200, such as Leafs 204, Servers 206, Hypervisors 208, Controllers 216, etc. As previously explained, Network Environment 200 can be configured according to one or more particular SDN solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 200. Endpoints can have one or more attributes such as a VM name, guest OS name, a security tag, application profile, etc. Application configurations can be applied between EPGs, instead of endpoints directly, in the form of contracts. Leafs 204 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by ACI virtual edge (AVE), which can run on a host, such as a server, e.g. a vSwitch running on a server. For example, the AVE can classify traffic based on specified attributes, and tag packets of different attribute EPGs with different identifiers, such as network segment identifiers (e.g., VLAN ID). Finally, Leafs 204 can tie packets with their attribute EPGs based on their identifiers and enforce policies, which can be implemented and/or managed by one or more Controllers 216. Leaf 204 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 2A, Network Environment 200 can deploy different hosts via Leafs 204, Servers 206, Hypervisors 208, VMs 210, Applications 212, and Controllers 216, such as VMWARE ESXi hosts, WINDOWS HYPER-V hosts, bare metal physical hosts, etc. Network Environment 200 may interoperate with a variety of Hypervisors 208, Servers 206 (e.g., physical and/or virtual servers), SDN orchestration platforms, etc. Network Environment 200 may implement a declarative model to allow its integration with application design and holistic network policy.

Controllers 216 can provide centralized access to fabric information, application configuration, resource configuration, application-level configuration modeling for a SDN infrastructure, integration with management systems or servers, etc. Controllers 216 can form a control plane that interfaces with an application plane via northbound APIs and a data plane via southbound APIs.

As previously noted, Controllers 216 can define and manage application-level model(s) for configurations in Network Environment 200. In some cases, application or device configurations can also be managed and/or defined by other components in the network. For example, a hypervisor or virtual appliance, such as a VM or container, can run a server or management tool to manage software and services in Network Environment 200, including configurations and settings for virtual appliances.

As illustrated above, Network Environment 200 can include one or more different types of SDN solutions, hosts, etc. For the sake of clarity and explanation purposes, various examples in the disclosure will be described with reference to an ACI framework, and Controllers 216 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 206 (e.g., physical or logical), Hypervisors 208, VMs 210, containers (e.g., Applications 212), etc., and can run or include any type of server or application solution. Non-limiting examples of "hosts" can include virtual switches or routers, such as distributed virtual switches (DVS), AVE nodes, vector packet processing (VPP) switches; VCENTER and NSX MANAGERS; bare metal physical hosts; HYPER-V hosts; VMs; DOCKER Containers; etc.

Figure 2B:
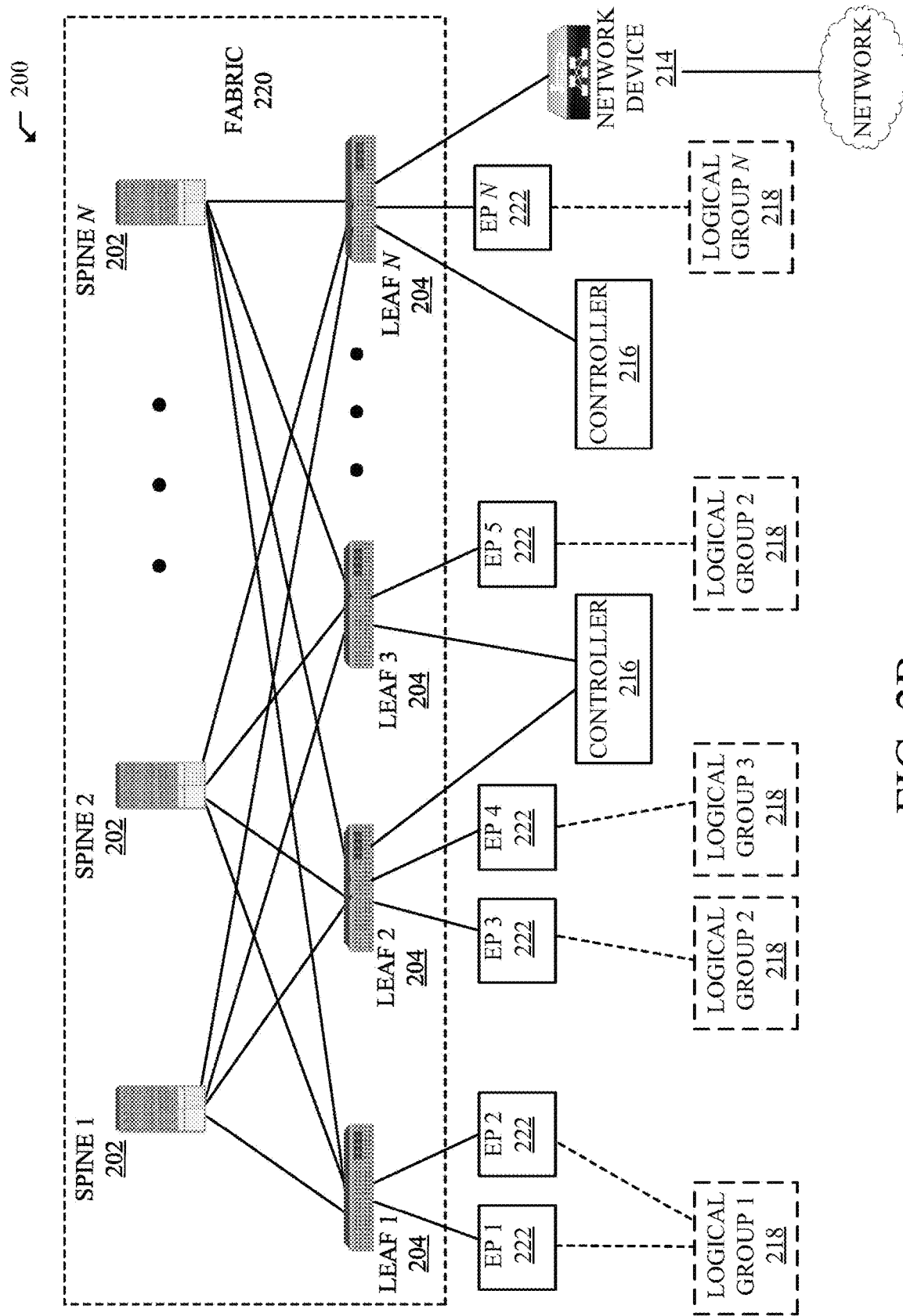
FIG. 2B illustrates another example of a network environment.

FIG. 2B illustrates another example of Network Environment 200. In this example, Network Environment 200 includes Endpoints 222 connected to Leafs 204 in Fabric 220. Endpoints 222 can be physical and/or logical or virtual entities, such as servers, clients, VMs, hypervisors, software containers, applications, resources, network devices, workloads, etc. For example, an Endpoint 222 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 222 can be associated with respective Logical Groups 218. Logical Groups 218 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 218 are EPGs in an ACI environment and/or other logical groups (e.g., SGs) in another SDN environment.

Traffic to and/or from Endpoints 222 can be classified, processed, managed, etc., based Logical Groups 218. For example, Logical Groups 218 can be used to classify traffic to or from Endpoints 222, apply policies to traffic to or from Endpoints 222, define relationships between Endpoints 222, define roles of Endpoints 222 (e.g., whether an endpoint consumes or provides a service, etc.), apply rules to traffic to or from Endpoints 222, apply filters or access control lists (ACLs) to traffic to or from Endpoints 222, define communication paths for traffic to or from Endpoints 222, enforce requirements associated with Endpoints 222, implement security and other configurations associated with Endpoints 222, etc.

In an ACI environment, Logical Groups 218 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between EPs or EPGs. For example, a Web EPG can provide a service that a Client EPG consumes, and that consumption can be subject to a filter (ACL) and a service graph that includes one or more services, such as firewall inspection services and server load balancing.

FIG. 3 illustrates a schematic diagram of an example virtual machine (VM) deployment 310. In this example, the host 302 can include one or more VMs 316. The VMs 316 can be configured to run workloads like VNFs based on hardware resources 312 on the host 302. The VMs 316 can run on guest operating systems 314 on a virtual operating platform provided by a hypervisor 318. Each VM can run a respective guest operating system which can be the same or different as other guest operating systems associated with other VMs on the host 302. Moreover, each VM can have one or more network addresses, such as an internet protocol (IP) address. The VMs 316 can communicate with hypervisors 318 and/or any remote devices or networks using the one or more network addresses.

Hypervisors 318 can be a layer of software, firmware, and/or hardware that creates and runs VMs 316. For example, the hypervisors 318 can be virtual machine managers (VMM) for hosting and managing the VMs 316. The guest operating systems running on VMs 316 can share virtualized hardware resources created by the hypervisors 318. The virtualized hardware resources can provide the illusion of separate hardware components. Moreover, the virtualized hardware resources can perform as physical hardware components (e.g., memory, storage, processor, network interface, etc.), and can be driven by the hardware resources 312 on the host 302. Hypervisors 318 can have one or more network addresses, such as an internet protocol (IP) address, to communicate with other devices, components, or networks. For example, the hypervisors 318 can have a dedicated IP address which they can use to communicate with VMs 316 and/or any remote devices or networks.

Hardware resources 312 can provide the underlying physical hardware driving operations and functionalities provided by the host 302, hypervisors 318, and VMs 316. Hardware resources 312 can include, for example, one or more memory resources, one or more storage resources, one or more communication interfaces, one or more processors, one or more circuit boards, one or more extension cards, one or more power supplies, one or more antennas, one or more peripheral components, etc.

The host 302 can also include one or more host operating systems (not shown). The number of host operating system can vary by configuration. For example, some configurations can include a dual boot configuration that allows the host 302 to boot into one of multiple host operating systems. In other configurations, the host 302 may run a single host operating system. Host operating systems can run on hardware resources 312. In some cases, a hypervisor 318 can run on, or utilize, a host operating system on the host 302.

The host 302 can also have one or more network addresses, such as an internet protocol (IP) address, to communicate with other devices, components, or networks. For example, the host 302 can have an IP address assigned to a communications interface from hardware resources 312, which it can use to communicate with VMs 316, hypervisor 318, switches, and/or any remote devices or networks.

In some examples, the host 302 can run a distributed function router. For example, VMs 316 on host 302 can host and execute one or more functionalities of the distributed function router. In some cases, host 302 can also host multiple distributed function routers via VMs 316. For example, VM 1 can host and run a first distributed function router and VM 2 can host and run a second distributed function router. The first and second distributed function routers can be different function routers or may be instances of a same function router which can be configured for load balancing, failover, auto-scaling, etc.

As discussed previously, the increased use of virtualized network environments in the field of networking has raised additional security concerns, in particular as attackers become more sophisticated. Specifically, virtualized network environments are susceptible to a wide variety of network threats, such as rogue VMs, denial-of-service (DoS) attacks, malware attacks, and other applicable types of malicious data traffic. A number of different tools have been developed to detect and isolate such threats at the VMs and the hypervisors supporting the VMs in a virtualized network environment. However, such tools suffer from a number of deficiencies. Specifically, network threats have already crossed the switch fabric of a virtualized network environment when threat remediation is performed in the hypervisor layer or the VM layer. As a result, a large number of VMs can be exposed to the network threat making it more difficult and costly from a computational perspective to isolate and remedy the threat. Further, this can cause increased latency in the virtualized network environment, e.g. as a result of the large amount of computational resources used to isolate and remedy the threat.

The present includes systems, methods, and computer-readable media for solving these problems/discrepancies. Specifically, the present technology involves systems, methods, and computer-readable media for performing threat remediation through a switch fabric of a virtualized network environment. In particular, the present technology involves systems, methods, and computer-readable media for identifying a network threat at a switch fabric of a virtualized network environment and performing one or more remedial measures before the threat is propagated further into the network environment beyond the switch fabric.

FIG. 4 illustrates an example virtualized network environment 400 in which threat remediation is performed through a switch fabric. The virtualized network environment 400 can be implemented according to an applicable network architecture, such as the cloud computing architecture 100 or fog computing architecture 150 shown in FIGS. 1A and 1B. Further, the virtualized network environment 400 can be implemented in an applicable network environment, such as the example network environment 200 shown in FIGS. 2A and 2B.

The virtualized network environment 400 can be formed, at least in part, according to an applicable virtual machine deployment, such as the VM deployment 310 shown in FIG. 3. Specifically, the virtualized network environment 400 includes a switch fabric 402. The switch fabric 402 can include physical hardware or virtualized hardware. Specifically, the switch fabric 402 can include a plurality of physical and/or virtualized network devices, e.g. switches, in the virtualized network environment.

The switch fabric 402 can support VMs, otherwise referred to as virtual compute nodes, which, in turn, support VNFs in the network environment. Specifically, the switch fabric 402 can function as a host and support a hypervisor layer 404 running on top of the switch fabric 402. The hypervisor 404 and the switch fabric 402 may be connected using network interface cards (not shown). For example, the hypervisor 404 can be connected to the switch fabric 402 using physical network interface cards (pNICs).

The hypervisor layer 404 functions according to an applicable layer for providing a virtual operating platform upon which one or more VNFs can run, such as the hypervisor 318 shown in FIG. 3. Specifically, the hypervisor layer 404 can function to create a virtual operating platform supporting one or more VMs in the virtual machine layer 406. In turn, the one or more VMs in the virtual machine layer 406 can perform VNFs in the virtualized network environment 400. For example, the virtual machine layer 406 can support VMs that function as firewalls in the virtualized network environment 400.

VNFs supported in the virtual machine layer 406 can form all or part of a virtual service chain. Specifically, VNFs in the virtual machine layer 406 can be stitched together, e.g. through the hypervisor layer 404, to form a virtual service chain of VNFs. A virtual service chain, as used herein, is a grouping of VNFs that are stitched together such that the VNFs apply operations to network traffic passing through the virtual service chain based on the arrangement of, e.g. in the order of, the VNFs in the virtual service chain.

The example virtualized network environment 400 includes a switch fabric threat remediation agent 408. The switch fabric threat remediation agent 408 is implemented, at least in part, in the virtualized network environment 400. Specifically, the switch fabric remediation agent 408 can be implemented, at least in part, in the switch fabric 402. More specifically, the switch fabric remediation agent can be implemented, at least in part, in a container in the virtualized network environment 400. As follows, the functions of the switch fabric remediation agent 408 can be performed, at least in part, in the switch fabric 402 itself. For example, the switch fabric remediation agent 408 can be implemented, at least in part, at one or more switches, either physical or virtualized, in the switch fabric 402. Further in the example, the switch fabric threat remediation agent 408 can perform threat remediation at the one or more switches in the switch fabric 402. Additionally, the switch fabric threat remediation agent 408 can be implemented, at least in part, remote from the virtualized network environment 400.

The switch fabric threat remediation agent 408 functions to monitor data traffic passing into the virtualized network environment 400. Specifically, the switch fabric threat remediation agent 408 can monitor data traffic passing into the virtualized network environment 400 through the switch fabric 402. More specifically, the switch fabric threat remediation agent 408 can monitor data traffic passing into the virtualized network environment 400 as ingress traffic to one or more nodes in the switch fabric 402. For example, the switch fabric threat remediation agent 408, when implemented at a first node, e.g. switch, in the switch fabric 402, can monitor traffic passing into the switch fabric 402 at the first node. Further in the example, the first node can act as an ingress point for the traffic in the switch fabric 402. Specifically, the first node can be the first switch in the switch fabric 402 that receives the traffic as the traffic enters the switch fabric 402.

Further, the switch fabric threat remediation agent 408 can identify one or more network threats in monitored data traffic. Specifically, the switch fabric threat remediation agent 408 can identify one or more network threats in data traffic in the switch fabric 402. For example, the switch fabric threat remediation agent 408 can be implemented at a first node in the switch fabric 402 and identify a network threat in traffic received at the first node in the switch fabric. A network threat, as used herein, can include an applicable threat in a network environment. For example, a network threat can include data traffic associated with a rogue VM, traffic associated with a DoS attack, traffic associated with a malware attack, or any other applicable malicious traffic in a network environment. In identifying network threats in data traffic in the switch fabric 402, the switch fabric threat remediation agent 408 can identify the network threats as they are first introduced into the virtualized network environment 400 through the switch fabric 402. Specifically, the switch fabric threat remediation agent 408 can identify the network threats before the threats propagate into, or otherwise through, the virtualized network environment 400 out of the switch fabric 402. More specifically, the switch fabric threat remediation agent 408 can identify the network threats before the data corresponding to the network threats is transmitted to either or both the hypervisor layer 404 and one or more VMs in the virtual machine layer 406.

The switch fabric threat remediation agent 408 can identify a network threat in monitored data traffic in the switch fabric 402 based on traffic patterns in the monitored data traffic. Specifically, the switch fabric threat remediation agent 408 can analyze traffic patterns of data traffic in the switch fabric 402 to identify a network threat in the data traffic. For example, the switch fabric threat remediation agent 408 can be implemented at a first node in the switch fabric 402 and monitor traffic patterns of data traffic transmitted to the first node to identify a network threat introduced through the data traffic. In identifying a network threat based on traffic patterns of data traffic passing into the switch fabric 402, the switch fabric threat remediation agent 408 can recognize a signature of a network threat in the monitored data traffic. Specifically, the switch fabric threat remediation agent 408 can identify a network threat in data traffic if a signature of the network threat is present in traffic patterns of the monitored data traffic in the switch fabric 402. For example, the switch fabric threat remediation agent 408 can recognize a DoS attack when a traffic pattern of monitored data traffic indicates that TCP/SYN packets are being flooded into the switch fabric 402, e.g. at an ingress traffic point to the switch fabric 402.

The switch fabric threat remediation agent 408 can identify a network threat in monitored data traffic in the switch fabric 402 based on characteristics of a known network threat. A known network threat can include a threat that is occurring or has previously occurred in either or both the virtualized network environment 400 or another network environment. Further, a known network threat can include an identified potential threat that has not actually occurred in a network environment. Characteristics of a known network threat can include applicable attributes of a network threat that indicate the occurrence of the known network threat. Specifically, characteristics of a known network threat can include attributes of data traffic carrying or otherwise deploying the known network threat. For example, characteristics of a known network threat can include an indication of a source of the known network threat. Further, characteristics of a known network threat can include a signature of the known network threat in a data traffic pattern.

In identifying a network threat in monitored data traffic based on a known network threat, the switch fabric threat remediation agent 408 can match characteristics of data traffic corresponding to the network threat to characteristics of the known network threat. For example, if a known network threat originated from a particular source, and the switch fabric threat remediation agent 408 detects data traffic in the switch fabric 402 from the particular source, then the switch fabric threat remediation agent 408 can identify a network threat in the data traffic. In matching characteristics of known network threats to patterns of monitored data traffic to identify a network threat in the data traffic, the switch fabric threat remediation agent 408 can identify network threats at a ternary content addressable memory (TCAM) level. Further, the switch fabric threat remediation agent 408 can match a signature of a known network threat to a signature in a traffic pattern of monitored data traffic to identify a network threat in the monitored traffic. Specifically, if a signature of a portion of monitored data traffic matches a signature of a known network threat, then the switch fabric threat remediation agent 408 can identify the portion of monitored data traffic as a network threat.

Characteristics of known network threats can be retrieved, or otherwise received, by the switch fabric threat remediation agent 408 from an applicable source. Specifically, characteristics of known network threats can be identified based on previous network threats occurring in the virtualized network environment. For example and as will be discussed in greater detail later, the switch fabric threat remediation agent 408 can receive characteristics of network threats as part of threat information disseminated throughout the virtualized network environment 400, e.g. throughout the switch fabric 402, in response to a detected threat in the virtualized network environment 400. Further, characteristics of known network threats can be retrieved from an applicable third party or outside source with respect to the virtualized network environment 400. For example, characteristics of known network threats can be retrieved by the switch fabric threat remediation agent 408 from one or a combination of a traffic analytics systems, e.g. Cisco® Encrypted Traffic Analytics (ETA) system, a cloud-based data store of known network threats, e.g. Cisco® Talos, and an anti-malware protection system. Additionally, characteristics of known network threats can be sourced across different network environments. Specifically, the switch fabric threat remediation agent 408 can received characteristics of known network threats across networks provided by different network service providers.

The switch fabric threat remediation agent 408 can identify a network threat in monitored data traffic in the switch fabric 402 based on either or both a traffic exclusion list, e.g. a blacklist, and a traffic inclusion list, e.g. a whitelist, for the virtualized network environment 400. A traffic exclusion list can include characteristics of data traffic, e.g. a source of traffic, a type of traffic, an application associated with traffic, and other applicable attributes describing data traffic, to refrain from transmitting through the virtualized network environment 400. For example, a traffic exclusion list can specify blocking traffic from a particular application source. A traffic inclusion list can include characteristics of data traffic to allow transmission of through the virtualized network environment 400. For example, a traffic inclusion list can specify allowing streaming media traffic through the virtualized network environment 400. In identifying a network threat based on a traffic exclusion list, the switch fabric threat remediation agent 408 can identify a network threat in monitored data traffic if the monitored data traffic matches characteristics of data traffic included in the traffic exclusion list. Similarly, the switch fabric threat remediation agent 408 can identify a lack of a network threat in monitored data traffic if the monitored data traffic matches characteristics of data traffic included in a traffic inclusion list.

The switch fabric threat remediation agent 408 can locally identify a network threat in the switch fabric 402. Specifically, nodes, e.g. switches, in the switch fabric can locally identify a network threat in monitored data traffic passing through the nodes. For example, the switch fabric threat remediation agent 408 can be implemented at a switch in the switch fabric 402 and locally identify a network threat in data traffic received at the switch.

Further, the switch fabric threat remediation agent 408 can locally identify a network threat in the switch fabric 402 according to one or more policies. Specifically, the switch fabric threat remediation agent 408 can locally identify a network threat in the switch fabric 402 according to one or more policies distributed to nodes in the switch fabric 402. The policies can include one or a combination of characteristics of known network threats, traffic exclusion lists for the virtualized network environment 402, and traffic inclusion lists for the virtualized network environment 402. For example, a policy distributed to a node in the switch fabric 402 implementing the switch fabric threat remediation agent 408 can include a signature of a known network threat. In turn, the node can use the policy to locally identify a network threat in data traffic received at the node if the signature of the known network threat matches a signature of the data traffic. In another example, a policy distributed to a node in the switch fabric 402 implementing the switch fabric threat remediation agent 408 can include a traffic exclusion list. In turn, the node can use the policy to locally identify a network threat in data traffic received at the node if characteristics of the data traffic match characteristics of data traffic included in the traffic exclusion list.

The switch fabric threat remediation agent 408 can remedy one or more identified network threats. Specifically, the switch fabric threat remediation agent 408 can perform one or more remedial measures in the virtualized network environment 400 in response to identifying a network threat in monitored data traffic in the switch fabric 402. The switch fabric threat remediation agent 408 can perform remedial measures in the switch fabric itself 402. Specifically, the switch fabric threat remediation agent 408 can perform remedial measures in the switch fabric 402 itself while the traffic corresponding to an identified network threat remains in the switch fabric 402. More specifically, the switch fabric threat remediation agent 408 can intercept the traffic corresponding to the network threat in the switch fabric 402 and perform one or more remedial measures while the traffic remains in the switch fabric 402.

Remedial measures can include applicable remedial measures applied to prevent or otherwise mitigate effects of an identified network threat in the virtualized network environment 400. Specifically, remedial measures can include quarantining or otherwise blocking transmission of data traffic corresponding to an identified network threat. More specifically, the switch fabric threat remediation agent 408 can block transmission of the data traffic corresponding to an identified network threat out of the switch fabric 402. In turn, this can prevent, at least in part, transmission of the traffic corresponding to the network threat further into the virtualized network environment 400. Specifically, this can prevent transmission of the traffic corresponding to the network threat to either or both the hypervisor layer 404 and one or more VMs in the virtual machine layer 406. By blocking transmission of traffic corresponding to a network threat out of the switch fabric 402, the switch fabric threat remediation agent 408 can solve the previously described deficiencies with respect to threat isolation and remedying when the threat has been propagated to VMs in the virtual machine layer 406 of the virtualized network environment 400. Specifically, the switch fabric threat remediation agent 408 can make computational resources available that would otherwise be used in isolating and remedying a network threat that has been propagated to VMs in the virtual machine layer 406. As follows, this can improve latency in the virtualized network environment 400.

The switch fabric threat remediation agent 408 can generate threat information in response to detecting a network threat in monitored data traffic at the switch fabric 402. In turn, the switch fabric threat remediation agent 408 can propagate the threat information to at least a portion of the switch fabric 402, e.g. as part of performing threat remediation for the network threat. Specifically, the switch fabric threat remediation agent 408 can be implemented at a first node in the switch fabric 402 and generate threat information for a network threat identified in traffic received at the first node. In turn, the switch fabric threat remediation agent 408 can distribute the threat information to other nodes in the switch fabric 402. In turn, either or both the first node and the other nodes in the switch fabric 402 can use the threat information to detect network threats in the switch fabric 402. Specifically, the other nodes in the switch fabric 402 can use the threat information to detect additional network threats, potentially the same type of network threat, in monitored data traffic received at the other nodes. Threat information for a network threat can include applicable information for identifying the network threat in monitored data traffic in the virtualized network environment 404, e.g. the switch fabric 402. For example, threat information for a network threat can include one or a combination of an identification of a type of threat of the network threat, an identification of a source of data traffic introducing the network threat into the virtualized network environment 400, a signature of the data traffic introducing the network threat, and an identification of characteristics of the data traffic introducing the network threat.

FIG. 5 illustrates an example of a network device 500 (e.g., switch, router, network appliance, etc.). The network device 500 can include a master central processing unit (CPU) 502, interfaces 504, and a bus 506 (e.g., a PCI bus). When acting under the control of appropriate software or firmware, the CPU 502 can be responsible for executing packet management, error detection, and/or routing functions. The CPU 502 preferably accomplishes all these functions under the control of software including an operating system and any appropriate applications software. The CPU 502 may include one or more processors 508 such as a processor from the Motorola family of microprocessors or the MIPS family of microprocessors. In an alternative embodiment, the processor 508 can be specially designed hardware for controlling the operations of the network device 500. In an embodiment, a memory 510 (such as non-volatile RAM and/or ROM) can also form part of the CPU 502. However, there are many different ways in which memory could be coupled to the system.

The interfaces 504 can be provided as interface cards (sometimes referred to as line cards). The interfaces 504 can control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 504 may include ports appropriate for communication with the appropriate media. In some cases, the interfaces 504 may also include an independent processor and, in some instances, volatile RAM. The independent processors may control communication intensive tasks such as packet switching, media control, and management. By providing separate processors for the communication intensive tasks, the interfaces 504 may allow the CPU 502 to efficiently perform routing computations, network diagnostics, security functions, and so forth.

Although the system shown in FIG. 5 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 500.

Regardless of the network device's configuration, it may employ one or more memories or memory modules (including the memory 510) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

FIG. 6 illustrates an example of a bus computing system 600 wherein the components of the system are in electrical communication with each other using a bus 605. The computing system 600 can include a processing unit (CPU or processor) 610 and a system bus 605 that may couple various system components including the system memory 615, such as read only memory (ROM) 620 and random access memory (RAM) 625, to the processor 610. The computing system 600 can include a cache 612 of high-speed memory connected directly with, in close proximity to, or integrated as part of the processor 610. The computing system 600 can copy data from the memory 615, ROM 620, RAM 625, and/or storage device 630 to the cache 612 for quick access by the processor 610. In this way, the cache 612 can provide a performance boost that avoids processor delays while waiting for data. These and other modules can control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in the storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing system 600, an input device 645 can represent any number of input mechanisms, such as a microphone for speech, a touch-protected screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing system 600. The communications interface 640 can govern and manage the user input and system output. There may be no restriction on operating on any particular hardware arrangement and therefore the basic features here may easily be substituted for improved hardware or firmware arrangements as they are developed.

The storage device 630 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 630 can include the software modules 632, 634, 636 for controlling the processor 610. Other hardware or software modules are contemplated. The storage device 630 can be connected to the system bus 605. In some embodiments, a hardware module that performs a particular function can include a software component stored in a computer-readable medium in connection with the necessary hardware components, such as the processor 610, bus 605, output device 635, and so forth, to carry out the function. For clarity of explanation, in some instances the present technology may be presented as including individual functional blocks including functional blocks comprising devices, device components, steps or routines in a method embodied in software, or combinations of hardware and software.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, media, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    monitoring, at a first node in a switch fabric, data traffic passing into a network environment including a plurality of virtual machines;
    detecting, at the first node, a traffic pattern indicative of a denial of service (DOS) attack within the monitored data traffic passing into the virtualized network environment;
    generating threat information in response to detecting the traffic pattern indicative of a DOS attack; and
    at the first node, using the threat information to block transmission of the DoS attack traffic at the switch fabric prior to the DOS attack traffic entering into either or both the virtual machines and one or more hypervisors hosting the virtual machines in the virtualized network environment.

2. The method of claim 1, wherein the threat information identifies DOS attack traffic at a ternary content addressable memory (TCAM) level.

3. The method of claim 1, further comprising: at a second node, using the threat information to block transmission of the DOS attack traffic from the switch fabric prior to the DOS attack traffic entering into either or both the virtual machines and one or more hypervisors hosting the virtual machines in the virtualized network environment.

4. The method of claim 1, wherein the threat information is propagated to more than one node in the switching fabric.

5. The method of claim 1, wherein the traffic pattern indicative of a DOS attack is based on monitoring for TCP/SYN packets in the data traffic monitored at the first node.

6. The method of claim 1, wherein the traffic pattern indicative of a DOS attack is based on matching a signature of a known network threat at the first node.

7. The method of claim 1, wherein the traffic pattern indicative of a DOS attack is based on matching an exclusion list at the first node.

8. A system comprising:
a switch fabric including a plurality of nodes, wherein each node in the plurality of nodes includes a physical network device, one or more processors, a memory; and wherein each node receives traffic to pass into a network environment including a plurality of virtual machines;
a switch fabric threat remediation agent, and
wherein the plurality of nodes and the switch fabric threat remediation agent include software instructions, which when executed by one or more processors within the switch fabric cause the system to perform operations including:
monitoring, at a first node in a switch fabric, data traffic passing into the network environment;
detecting, at the first node, a traffic pattern indicative of a denial of service (DOS) attack within the monitored data traffic passing into the virtualized network environment,
generating threat information in response to detecting the traffic pattern indicative of a DOS attack;
at the first node, using the threat information to block transmission of the DOS attack traffic at the physical network device prior to the DOS attack traffic entering into either or both the virtual machines and one or more hypervisors hosting the virtual machines in the virtualized network environment.

9. The system of claim 8, wherein the switch fabric threat remediation agent is implemented, at least in part, in the virtualized network environment.

10. The system of claim 8, wherein the switch fabric threat remediation agent is implemented, at least in part, in a container within the virtualized network environment.

11. The system of claim 8, wherein the switch fabric threat remediation agent is implemented, at least in part, either physical or virtualized, in the switch fabric.

12. The system of claim 8, wherein the threat information identifies DOS attack traffic at a ternary content addressable memory (TCAM) level.

13. The system of claim 8, wherein the threat information is propagated to more than one node of the plurality of nodes.

14. The system of claim 13, wherein each node that receives the propagated threat information uses the threat information to prevent transmission of the DOS attack traffic from the switch fabric into either or both the virtual machines and one or more hypervisors hosting the virtual machines in the virtualized network environment.

15. The system of claim 8, wherein the traffic pattern indicative of a DoS attack is based on monitoring for TCP/SYN packets in the data traffic monitored at the first node.

16. A non-transitory media storing program instructions, which when executed by one or more processors in a system comprising a plurality of nodes organized in a switch fabric, which when executed by one or more processors within the switch fabric cause the system to perform operations including:
monitoring, at a first node in the switch fabric, data traffic passing into a virtualized network environment;
detecting, at the first node, a traffic pattern indicative of a denial of service (DOS) attack within the monitored data traffic passing into the virtualized network environment;
generating threat information in response to detecting the traffic pattern indicative of a DOS attack; and
at the first node, using the threat information to block transmission of the DoS attack traffic at the switch fabric prior to the DOS attack traffic entering into at least one hypervisor or virtual machine in the virtualized network environment.

17. The non-transitory media of claim 16, wherein the operations further include configuring the first node to identify DOS attack traffic at a ternary content addressable memory (TCAM) level.

18. The non-transitory media of claim 16, wherein the operations further include propagating the threat information to more than one node of the plurality of nodes.

19. The non-transitory media of claim 18, wherein the operations further include using the threat information to block transmission of DOS attack traffic at each node that receives the propagated threat information prior to the DOS attack traffic entering into at least one hypervisor or virtual machine in the virtualized network environment.

20. The non-transitory media of claim 16, wherein the traffic pattern indicative of a denial of service (DOS) attack is based on monitoring for TCP/SYN packets in the data traffic monitored at the first node.

* * * * *